United States Patent
Turner

Patent Number: 5,111,632
Date of Patent: May 12, 1992

[54] EXPANDABLE JOIST HANGER

[76] Inventor: Arthur R. Turner, 9, The Parapet, Terranora, New South Wales 248, Australia

[21] Appl. No.: 584,898

[22] Filed: Sep. 19, 1990

[30] Foreign Application Priority Data

Sep. 6, 1990 [AU] Australia .............................. 62222/90

[51] Int. Cl.⁵ ............................................. E04B 1/38
[52] U.S. Cl. ........................................ 52/702; 52/703; 52/713; 403/232.1
[58] Field of Search .................... 52/702, 703, 713; 403/232.1

[56] References Cited

U.S. PATENT DOCUMENTS

| | | | |
|---|---|---|---|
| 796,433 | 10/1904 | Kahn | 52/702 |
| 3,000,145 | 9/1961 | Fine | 52/713 |
| 3,420,560 | 5/1966 | Pfahning | 52/703 |
| 3,445,977 | 5/1969 | Latiano | 52/713 |
| 4,893,961 | 1/1990 | O'Sullivan et al. | 52/702 |

FOREIGN PATENT DOCUMENTS

2047320  11/1980  United Kingdom ................. 52/702

Primary Examiner—David A. Scherbel
Assistant Examiner—Kien Nguyen
Attorney, Agent, or Firm—Harry M. Weiss

[57] ABSTRACT

A joist hanger is provided which includes a pair of side brackets having oppositely directed flanges for fixture to an interposed joint. A platform member is provided that is engageable between the side brackets and is used to vary the spacing between parallel flanges of the side brackets by slidable movement of one side bracket relative to the platform member.

7 Claims, 2 Drawing Sheets

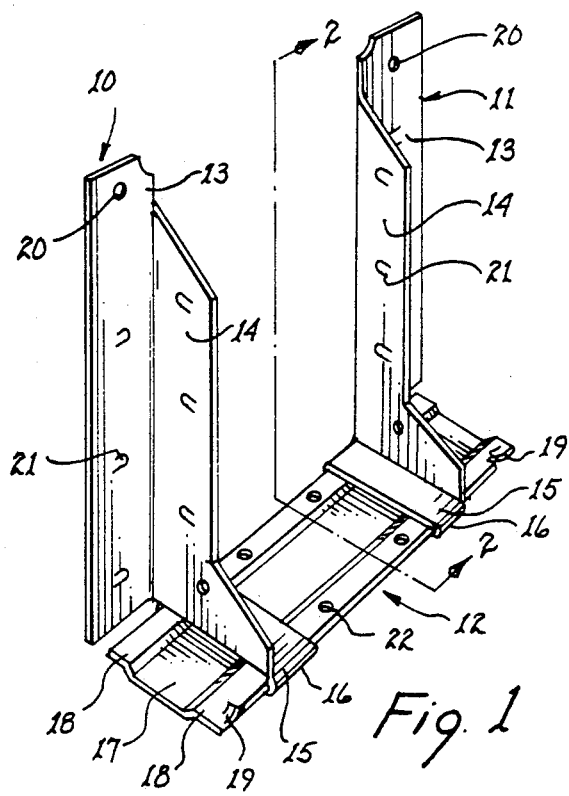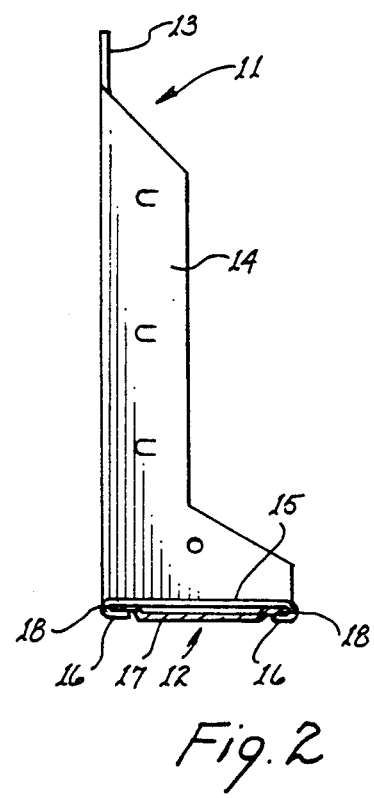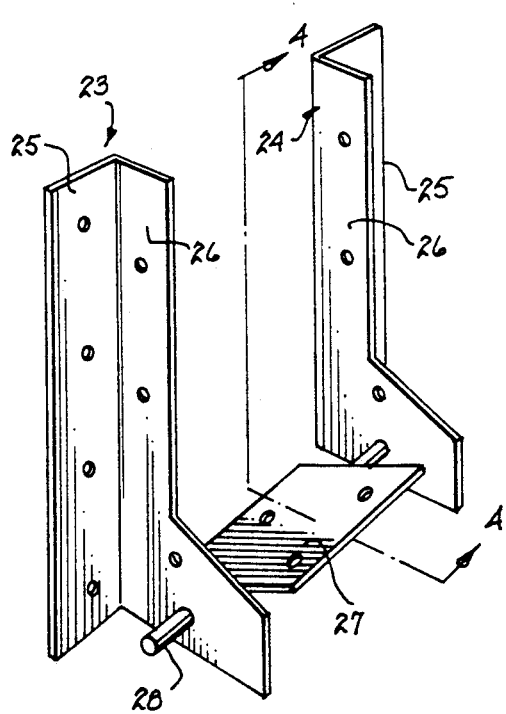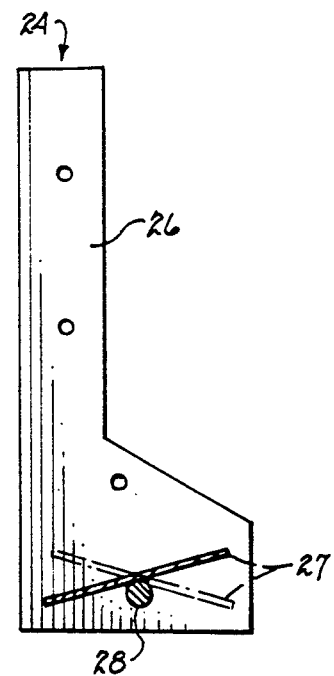

EXPANDABLE JOIST HANGER

This invention relates to joist hangers and like connectors.

Joist hangers are well-known and widely used in timber structures, such as a hanger commonly being of galvanized sheet steel shaped to form a platform flanked by a pair of integrally formed and oppositely arranged angle members with nail holes or prongs or both. Outwardly directed flanges of the two angle members can be nailed to a beam, and an end of a joist may be located between the parallel flanges of the angle members and seated on the platform, the parallel angle members, and sometimes the platform also, being nailed to the joist.

Because of the great range of dimensions to which joists are made, a very wide variety of joist hangers are produced, resulting in problems in stocking as well as additional costs and general inconvenience to builders and suppliers.

The present invention has been devised with the general object of overcoming or greatly diminishing the present disadvantages by providing joist hangers or like connectors for timber structures which are readily adjustable to suit joists or other timber members of varying widths as well as angular dispositions to a beam of the like to which they are to be connected.

With the foregoing and other objects in view the invention resides broadly in a joist hanger of the type including a pair of side brackets with oppositely directed flanges for fixture to a beam, and substantially parallel flanges for fixture to the sides of an interposed joist, wherein there is provided a platform member engageable between the side brackets in such manner that the spacing between the parallel flanges of the side brackets is variable by slidable movement of at least one side bracket relative to the platform. Other features of the invention will become apparent from the following description.

In order that preferred embodiments of the invention may be readily understood and carried into practical effect, reference is now made to the accompanying wherein:

FIG. 1 is a perspective view of a joist hanger according to the invention,

FIG. 2 is a section view of the joist hanger taken along line 2—2 in FIG. 1,

Figure 5:
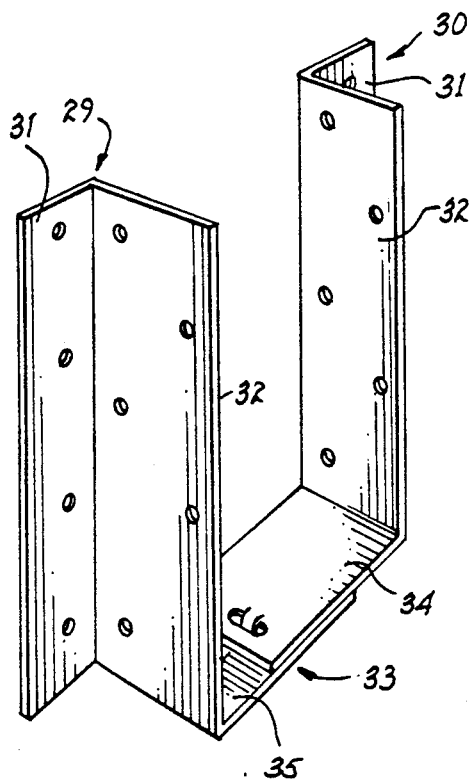
Figure 6:
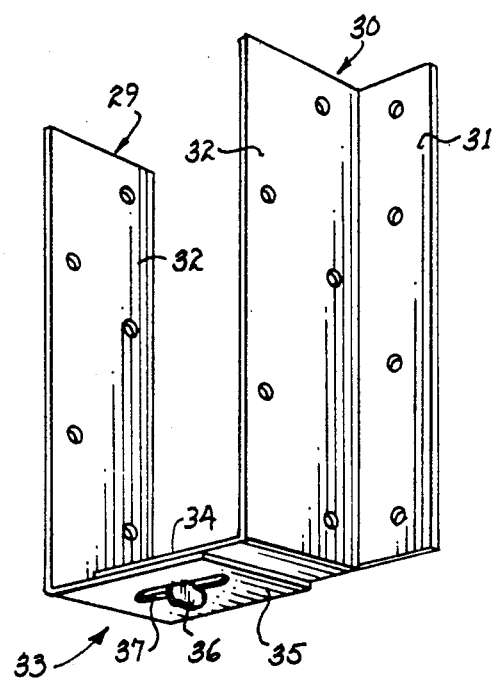
Figure 7:
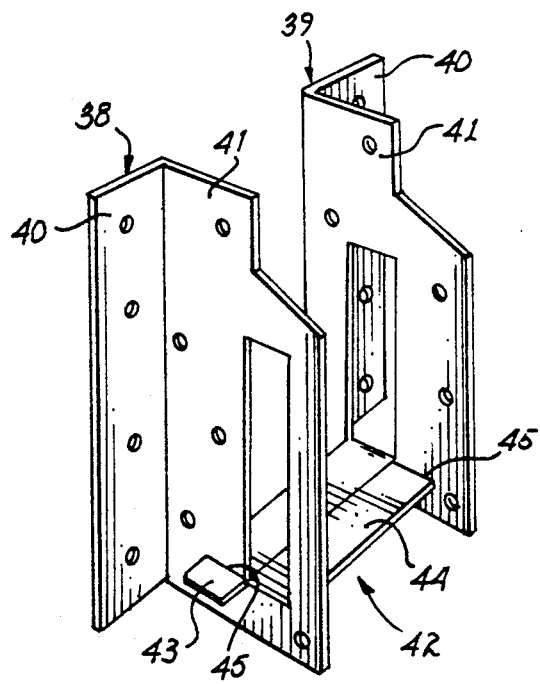
Figure 8:
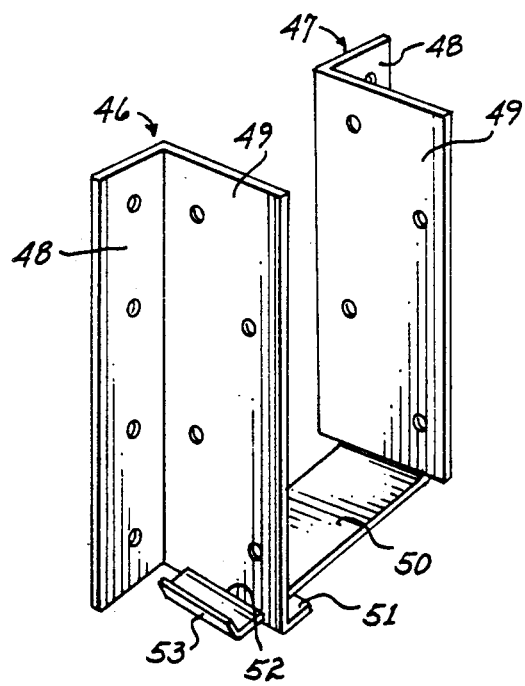

FIG. 3 is a perspective view of a joist hanger according to an alternative embodiment of the invention, FIG. 4 is a sectional view along line 4—4 in FIG. 3, FIG. 5 is a perspective view of a joist hanger according to further embodiment of the invention, viewed from above, FIG. 6 is a perspective view from below of the joist hanger shown in FIG. 5, FIG. 7 is a perspective view a joist hanger according to another embodiment of the invention, and FIG. 8 shows in perspective a joist hanger according to a still further embodiment of the invention.

Referring initially to FIGS. 1 and 2 of the drawings, the joist hanger shown therein includes a pair of oppositely arranged but otherwise similar side brackets 10 and 11 and a platform 12 slidably engaged with both side brackets.

Each of the side brackets is made of, for example, galvanized sheet steel cut and shaped to form a beam attachment flange 13 and an integral joist attachment flange 15 perpendicular to the beam attachment flange. The lower part of the joist attachment flange is of greater width than its upper part, and it is formed with an integral extension of still greater width which is shaped to form a platform guide 15 by being bent perpendicularly to the joist attachment flange, its two extremities being formed with opposed U-bends at 16.

The platform 12 is shaped from a rectangular blank, being formed with two pairs of parallel longitudinal bends so that its central part 17 is depressed relative to its co-planar side flanges 18. These side flanges of the platform are slidably engaged with the platform guides 15 of the two brackets 10 and 11, fitting closely in the U-bends 16. In one of the platform side flanges there are formed, near to its ends, L-shaped cuts, the metal within these cuts being deformed, as indicated at 19, to form stops which prevent the brackets 10 and 11 from being slidably disengaged from the platform 12.

Nail holes 20 and U-shaped cuts 21 are made in the bracket side flanges 10 and 11, and nail holes 22 are made in the platform 12.

In use, the side brackets 10 and 11 of the joist hanger are slidable adjusted to suit the thickness of the joist they are to support and the beam attachment flanges 13 are nailed to a beam (not shown). An end of a joist (not shown) is positioned between the flanges 10 and 11 and resting on the platform 12, and these flanges, and if desired the platform also, are nailed to the joist. If desired the tops of the beam attachment flanges 13 may be bent over, and nailed to, the beam for additional security.

The embodiment of the invention shown in FIGS. 3 and 4 again has angled side brackets 23 and 24 with beam attachment and joist attachment flanges 25 and 26 for nailing to a beam for supporting an end of a joist, and a platform 27 which is angularly adjustable to assist in the support of a joist which may be angled to horizontal. The platform 27 is a flat rectangular plate welded centrally on a pivoting slide rod 28 extending to both side of the platform and slidable in corresponding holes near the bottom of the joist attachment flanges 26. As in the embodiment of FIGS. 1 and 2 the spacing between the side brackets may be adjusted to suit the thickness of a joist, the rod 28 sliding in one or both side brackets. Moreover the platform 27 may be angularly adjusted so that the end of the non-horizontal joist abutting the beam may seat firmly on the platform.

In the embodiment of the invention shown in FIGS. 5 and 6 a joist hanger comprises a pair of side brackets 29 and 30 each with a beam attachment flange 31 and a perpendicular joist attachment flange 32. The platform 33 of the joist hanger consists mainly of two overlying parts, namely an upper section 34 which is a perpendicular integral extension of the joist attachment flange 32 of the side bracket 30, and a lower section 35 which is a similar extension of the joist attachment flange 32 of the other side bracket 29. The two platform sections are normally interconnected in slidably adjustable manner by the engagement of an enlarged-headed lug 36, pressed from the upper section 34, in a slot 37 formed in the lower platform section 35. The direction of the head of the lug 36 is perpendicular to that of the slot.

In the embodiment of FIG. 7 each of the two angled side brackets 38 and 39 includes a beam attachment flange 40 and a fairly wide joist attachment bracket 41. The platform 42 of the joist hanger consists of two adjacent tongues 43 and 44 which are pressed from elongated inverted U-shaped cuts in the joist attachment flanges 41 of the two side brackets, the tongue of each bracket being inserted closely through a normally horizontal slot 45 in the joist attachment flange 41 of the other bracket, the slot 45 in each case leading from the bottom of the U-shaped cut from which the tongue was pressed.

In the form of the invention shown in FIG. 8, two angled side brackets 46 and 47 each include a beam attachment flange 48 and a joist attachment flange 49. A platform 50 is a perpendicular extension from the bottom of the joist attachment flange 49 of side bracket 47 and it rides slidably over a bearer 51 which is a perpendicular extension from the bottom of the joist attachment flange 49 of the side bracket 46, and through a slot 52 in that joist attachment flange, directly above the bearer 51. To prevent accidental separation of the platform 50 from the side bracket 46, the extremity of the platform is up-turned or otherwise deformed to form a stop as indicated at 53.

Joist hangers according to the invention will be found to be very effective in achieving the objects for which they have been devised. Various modifications of constructional detail and design, which will be readily apparent to persons skilled in the art, may be made without departing from the scope and ambit of the invention.

The claims defining the invention are as follows; I claim:

1. A joist hanger to attach the end of a joist to a vertical side face of a member which is to support the joist comprising:
    a pair of side brackets, each one of said pair of side brackets having a flange for fixture to the vertical side face, each one of said pair of side brackets providing one of a pair of substantially parallel flanges extending outwardly and perpendicularly from the vertical side face to receive the end of a joist therebetween; and
    a platform member means mounted to the side brackets near their lower extremity, the platform member means spanning the distance therebetween and supported thereby to support the joist;
    the side brackets being slidable in a direction along the platform member means relative to each other to vary the relative spacing therebetween.

2. A joist hanger according to claim 1 wherein platform guides are coupled to said platform member means, the platform member means is slidable through the platform guides, each one of the guides is formed integrally with each of the side brackets.

3. A joist hanger according to claim 2 wherein:
    the platform member means has stops to prevent its slidable disengagement from either of the platform guides.

4. A joist hanger according to claim 1 wherein:
    the platform member means is coupled to a slide pivot rod, the end portions of said pivot rod are slidable through and rotatable in holes in the side brackets.

5. A joist hanger according to claim 1 wherein:
    the platform member means comprises two superimposed sections one formed integrally with and extending perpendicularly from one of the side brackets the other formed integrally with and extending perpendicularly from the other of the side brackets, the two sections being slidably interconnected.

6. A joist hanger according to claim 1 wherein:
    the platform member means comprises two adjacent sections, each formed integrally with and extending perpendicularly from one side bracket and passing slidably through an opening in the other side bracket.

7. A joist hanger according to claim 1 wherein:
    the platform member means is formed integrally with and extends perpendicularly from one of the side brackets and is slidable through an opening in the other of the side brackets.

* * * * *